(12) United States Patent
Choi et al.

(10) Patent No.: US 11,396,472 B2
(45) Date of Patent: Jul. 26, 2022

(54) ENAMEL COMPOSITION, METHOD FOR PREPARING ENAMEL COMPOSITION, AND COOKING APPLIANCE

(71) Applicant: LG ELECTRONICS INC., Seoul (KR)

(72) Inventors: Suyeon Choi, Seoul (KR); Young Seok Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 100 days.

(21) Appl. No.: 16/796,075

(22) Filed: Feb. 20, 2020

(65) Prior Publication Data
US 2020/0270167 A1 Aug. 27, 2020

(30) Foreign Application Priority Data
Feb. 22, 2019 (KR) .................. 10-2019-0021140

(51) Int. Cl.
*C03C 8/02* (2006.01)
*C03C 8/20* (2006.01)
(Continued)

(52) U.S. Cl.
CPC .................. *C03C 8/02* (2013.01); *C03C 8/16* (2013.01); *C03C 8/20* (2013.01); *F24C 15/005* (2013.01); *C03C 2207/04* (2013.01)

(58) Field of Classification Search
CPC ............ C03C 3/04; C03C 3/06; F24C 15/005
See application file for complete search history.

(56) References Cited

U.S. PATENT DOCUMENTS 3,547,098 A  12/1970  Lee
3,580,733 A  5/1971  Ott
(Continued)

FOREIGN PATENT DOCUMENTS

AU  2370367  1/1969
BG  98027  3/1994
(Continued)

OTHER PUBLICATIONS

European Search Report dated Jun. 24, 2020 issued in EP Application No. 20158729.2.
(Continued)

*Primary Examiner* — Karl E Group
(74) *Attorney, Agent, or Firm* — KED & Associates

(57) ABSTRACT

An enamel composition, a method for preparing an enamel composition, and a cooking appliance are provided. The enamel composition may include silicon dioxide ($SiO_2$) at 25 to 50 wt %; boron oxide ($B_2O_3$) at 1 to 15 wt %; one or more of lithium superoxide ($Li_2O$), sodium oxide ($Na_2O$), or potassium oxide ($K_2O$) at 10 to 20 wt %; sodium fluoride (NaF) at 1 to 5 wt %; zinc oxide (ZnO) at 1 to 10 wt %; and one or more of titanium dioxide ($TiO_2$), molybdenum trioxide ($MoO_3$), bismuth oxide ($Bi_2O_3$), or cerium dioxide ($CeO_2$) at 20 to 40 wt %, such that a heating time required for cleaning is shortened and cleaning is possible without carrying out a water soaking process.

5 Claims, 3 Drawing Sheets

(51) Int. Cl.
    *F24C 15/00*    (2006.01)
    *C03C 8/16*    (2006.01)

(56) References Cited

U.S. PATENT DOCUMENTS

| | | |
|---|---|---|
| 3,718,498 A | 2/1973 | Denny et al. |
| 4,084,975 A | 4/1978 | Faust |
| 4,180,482 A | 12/1979 | Nishino et al. |
| 4,460,630 A | 7/1984 | Nishino et al. |
| 4,877,758 A | 10/1989 | Lee et al. |
| 5,650,364 A | 7/1997 | Münstedt et al. |
| 5,747,395 A | 5/1998 | Smith et al. |
| 6,123,874 A | 9/2000 | Fukaya et al. |
| 6,321,569 B1 | 11/2001 | Sreeram et al. |
| 6,350,495 B1 | 2/2002 | Schriener et al. |
| 6,429,161 B1 | 8/2002 | Souchard et al. |
| 6,511,931 B1 | 1/2003 | Baldwin |
| 6,652,972 B1 | 11/2003 | Conzone et al. |
| 6,881,690 B2 | 4/2005 | Kawamura et al. |
| 6,924,246 B2 | 8/2005 | Kato et al. |
| 8,815,347 B2 | 8/2014 | Shimoda et al. |
| 2003/0119647 A1 | 6/2003 | Sanichi et al. |
| 2003/0162646 A1 | 8/2003 | Kawamura et al. |
| 2003/0187118 A1 | 10/2003 | Aronica et al. |
| 2004/0043053 A1 | 3/2004 | Yu et al. |
| 2004/0069764 A1 | 4/2004 | Imai et al. |
| 2005/0014625 A1 | 1/2005 | Espargilliere et al. |
| 2005/0148722 A1 | 7/2005 | Aronica et al. |
| 2008/0044488 A1 | 2/2008 | Zimmer et al. |
| 2009/0311514 A1 | 12/2009 | Shon et al. |
| 2010/0009837 A1 | 1/2010 | Sakoske |
| 2010/0264126 A1 | 10/2010 | Baek et al. |
| 2011/0011423 A1 | 1/2011 | Baek et al. |
| 2011/0049122 A1 | 3/2011 | Baek et al. |
| 2011/0174826 A1 | 7/2011 | Le Bris et al. |
| 2011/0262758 A1 | 10/2011 | Benford, Jr. et al. |
| 2011/0277505 A1 | 11/2011 | Sakoske |
| 2013/0149444 A1 | 6/2013 | Le Bris et al. |
| 2013/0299482 A1 | 11/2013 | Kim et al. |
| 2013/0299484 A1 | 11/2013 | Lee et al. |
| 2015/0083109 A1 | 3/2015 | Baek et al. |
| 2018/0170797 A1 | 6/2018 | Gorecki et al. |
| 2018/0215654 A1 | 8/2018 | Choi et al. |
| 2018/0215655 A1 | 8/2018 | Kim et al. |
| 2019/0002336 A1 | 1/2019 | Kim et al. |
| 2019/0092680 A1 | 3/2019 | Kim et al. |
| 2019/0337837 A1 | 11/2019 | Kim et al. |
| 2020/0115274 A1 | 4/2020 | Awagakubo et al. |
| 2020/0148583 A1 | 5/2020 | Choi et al. |
| 2020/0270171 A1 | 8/2020 | Gwoo et al. |

FOREIGN PATENT DOCUMENTS

| | | |
|---|---|---|
| CN | 1042890 | 6/1990 |
| CN | 1105343 | 7/1995 |
| CN | 1108626 | 9/1995 |
| CN | 1176942 | 3/1998 |
| CN | 1487240 | 4/2004 |
| CN | 1892962 | 1/2007 |
| CN | 101067207 | 11/2007 |
| CN | 101094818 | 12/2007 |
| CN | 101182119 | 5/2008 |
| CN | 101519275 | 9/2009 |
| CN | 101519276 | 9/2009 |
| CN | 101734858 | 6/2010 |
| CN | 102066011 | 5/2011 |
| CN | 102086091 | 6/2011 |
| CN | 102089253 | 6/2011 |
| CN | 102219383 | 10/2011 |
| CN | 102368933 | 3/2012 |
| CN | 102369168 | 3/2012 |
| CN | 102422085 | 4/2012 |
| CN | 102517582 | 6/2012 |
| CN | 104891805 | 9/2015 |
| CN | 104891810 | 9/2015 |
| CN | 105621889 | 6/2016 |
| CN | 106957149 | 7/2017 |
| CN | 107513747 | 12/2017 |
| CN | 108059341 | 5/2018 |
| CN | 108675636 | 10/2018 |
| CN | 108863074 | 11/2018 |
| EP | 0 086 109 | 8/1983 |
| EP | 0 453 897 | 10/1991 |
| EP | 0 565 941 | 10/1993 |
| EP | 1 160 283 | 12/2001 |
| EP | 1 256 556 | 11/2002 |
| EP | 1 298 099 | 4/2003 |
| EP | 2 662 341 | 11/2013 |
| EP | 3 357 877 | 8/2018 |
| EP | 3 459 914 | 3/2019 |
| EP | 3 578 525 | 12/2019 |
| EP | 3 650 414 | 5/2020 |
| GB | 1 214 261 | 12/1970 |
| HU | 01 00796 | 8/2002 |
| JP | S54-77618 | 6/1979 |
| JP | S54-106529 | 8/1979 |
| JP | 54153819 A * | 12/1979 |
| JP | S55-75740 | 6/1980 |
| JP | S56-78450 | 6/1981 |
| JP | 2001-080935 | 3/2001 |
| JP | 2001-303276 | 10/2001 |
| JP | 2002-367510 | 12/2002 |
| JP | 2003-206417 | 7/2003 |
| JP | 2004-358846 | 12/2004 |
| JP | 2005-008974 | 1/2005 |
| JP | 2014-148465 | 8/2014 |
| JP | 2014-221937 | 11/2014 |
| JP | 2016-030849 | 3/2016 |
| KR | 10-2011-0023079 | 3/2011 |
| KR | 10-2013-0125907 | 11/2013 |
| KR | 10-2013-0125910 | 11/2013 |
| KR | 10-2013-0125918 | 11/2013 |
| KR | 10-2014-0014658 | 2/2014 |
| KR | 10-2014-0115562 | 10/2014 |
| KR | 10-1476501 | 12/2014 |
| KR | 10-2018-0089986 | 8/2018 |
| KR | 10-2018-0089988 | 8/2018 |
| RU | 2007112383 | 10/2008 |
| WO | WO 95/09131 | 4/1995 |
| WO | WO 01/92413 | 12/2001 |
| WO | WO 02/02471 | 1/2002 |
| WO | WO 03/008354 | 1/2003 |
| WO | WO 2018/143704 | 8/2018 |
| WO | WO 2018/198986 | 11/2018 |
| WO | WO 2019/203565 | 10/2019 |

OTHER PUBLICATIONS

European Search Report dated Jun. 24, 2020 issued in EP Application No. 20158736.7.
European Search Report dated Jun. 24, 2020 issued in EP Application No. 20158756.5.
European Search Report dated Jun. 29, 2020 issued in EP Application No. 20158751.6.
European Search Report dated Jul. 22, 2020 issued in EP Application No. 20158670.8.
European Search Report dated Jul. 22, 2020 issued in EP Application No. 20158683.1.
European Search Report dated Jul. 22, 2020 issued in EP Application No. 20158690.6.
Korean Notice of Allowance dated Jul. 27, 2020 issued in KR Application No. 10-2019-0021145.
European Search Report dated Mar. 24, 2020 issued in Application No. 19207979.6.
Chinese Office Action dated Jul. 26, 2021 issued in CN Application No. 1911042287.3.
Chinese Office Action dated Jul. 27, 2021 issued in CN Application No. 202010107767.X.
Chinese Office Action dated Jul. 28, 2021 issued in CN Application No. 202010107396.5.
Chinese Office Action dated Jul. 28, 2021 issued in CN Application No. 202010107406.5.

(56) References Cited

OTHER PUBLICATIONS

Chinese Office Action dated Jul. 28, 2021 issued in CN Application No. 202010107479.4.
Chinese Office Action dated Jul. 28, 2021 issued in CN Application No. 202010107792.8.
Chinese Office Action dated Aug. 2, 2021 issued in CN Application No. 201911087064.9.
Chinese Office Action dated Aug. 2, 2021 issued in CN Application No. 202010107397.X.
Chinese Office Action dated Aug. 2, 2021 issued in CN Application No. 202010107499.1.
U.S. Appl. No. 16/666,979, filed Oct. 29, 2019.
U.S. Appl. No. 16/676,903, filed Nov. 7, 2019.
U.S. Appl. No. 16/795,923, filed Feb. 20, 2020.
U.S. Appl. No. 16/795,959, filed Feb. 20, 2020.
U.S. Appl. No. 16/796,066, filed Feb. 20, 2020.
U.S. Appl. No. 16/796,052, filed Feb. 20, 2020.
U.S. Appl. No. 16/796,102, filed Feb. 20, 2020.
U.S. Appl. No. 16/796,127, filed Feb. 20, 2020.
European Search Repot dated Mar. 24, 2020 issued in Application No. 19205924.4.
United States Notice of Allowance dated Nov. 23, 2021 issued in co-pending related U.S. Appl. No. 16/795,923.
United States Office Action dated Apr. 4, 2022 issued in co-pending related U.S. Appl. No. 16/796,127.

\* cited by examiner

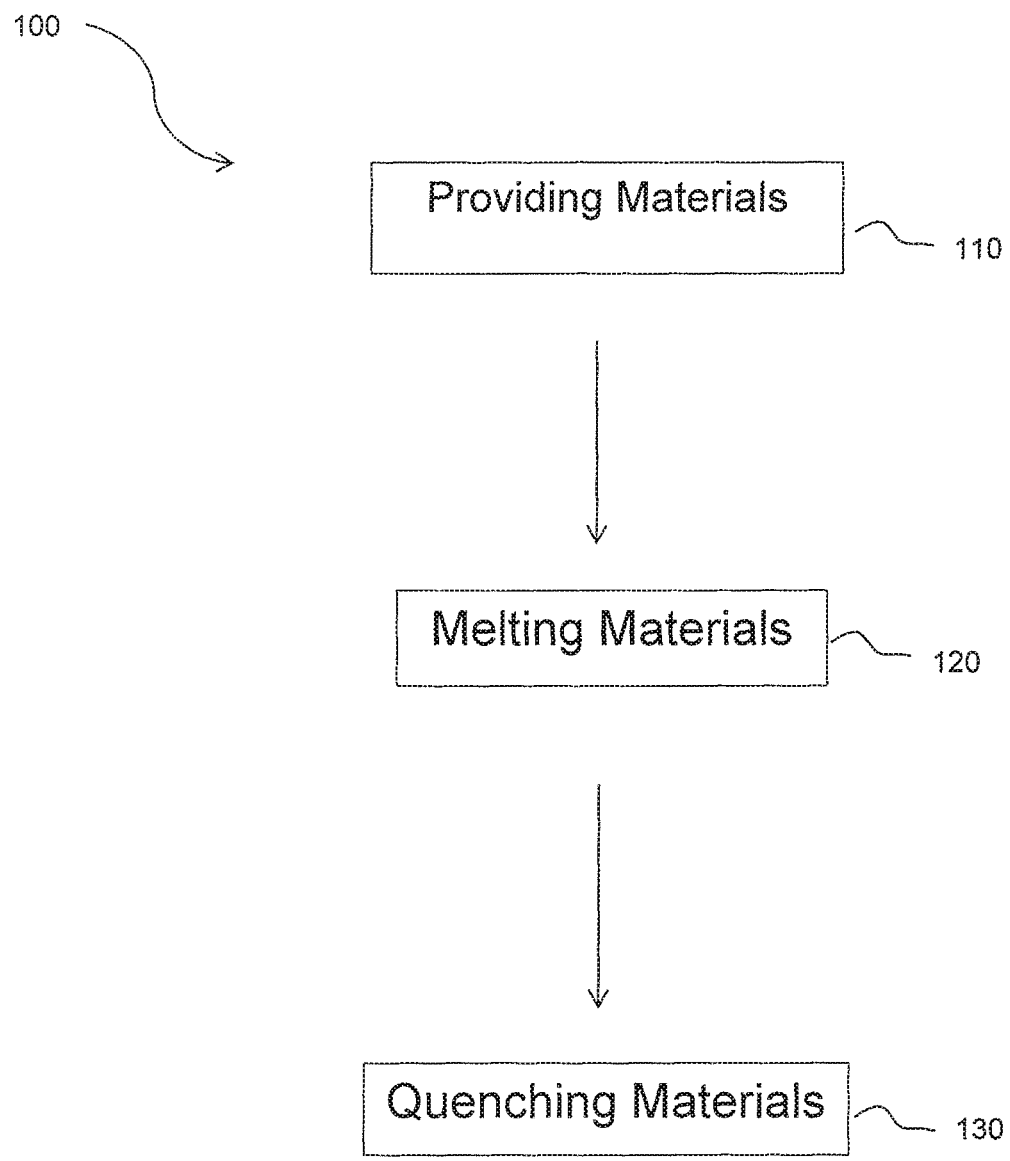

ENAMEL COMPOSITION, METHOD FOR PREPARING ENAMEL COMPOSITION, AND COOKING APPLIANCE

CROSS-REFERENCE TO RELATED APPLICATION(S)

This application claims priority to and the benefit of Korean Patent Application No. 10-2019-0021140, filed in Korea on Feb. 22, 2019, the disclosure of which is incorporated herein by reference in its entirety.

BACKGROUND

1. Field

An enamel composition, a method for preparing an enamel composition, and a cooking appliance are disclosed herein.

2. Background

Enamel is a material made by applying a vitreous glaze onto a surface of a metal plate. Common enamel is used in cooking appliances, such as microwaves and ovens. Cooking appliances, such as electric ovens and gas ovens, for example, are appliances that cook food or other items (hereinafter, collectively "food") using a heating source. As contaminants generated during cooking adhere to an inner wall of a cavity of the cooking appliance, the inner wall of the cavity needs to be cleaned. In this case, enamel applied onto the inner wall surface of the cavity of the cooking appliance facilitates removal of contaminants adhered to the cooking appliance. Generally, a pyrolysis method, in which contaminants are burned at high temperature to produce ashes, is known as a technique that easily cleans the inner wall of the cavity, and as a enamel composition to which the pyrolysis method can be applied, an enamel composition containing components, such as phosphorus pentoxide ($P_2O_5$), silicon dioxide ($SiO_2$), and boron oxide ($B_2O_3$), for example, is known.

However, the conventional enamel compositions consume a large amount of energy because the conventional enamel compositions enable cleaning only when heated (pyrolyzed) under a condition of a high temperature of 450 to 500° C. for about 4 hours. Further, the conventional enamel compositions require a water soaking process for a predetermined period of time to remove oil contaminants, such as cattle, pig, and poultry oils, and thus, there is a problem in which a cleaning process is complicated. Furthermore, enamel compositions should not be denatured and damaged at a high temperature of 450 to 500° C., but the conventional enamel compositions have a problem of degradation of durability at high temperature.

BRIEF DESCRIPTION OF THE DRAWINGS

Embodiments will be described in detail with reference to the following drawings in which like reference numerals refer to like elements, and wherein:

FIG. 4 is a flow chart of method for preparing an enamel composition according to an embodiment.

DETAILED DESCRIPTION

Enamel Composition

Figure 1:
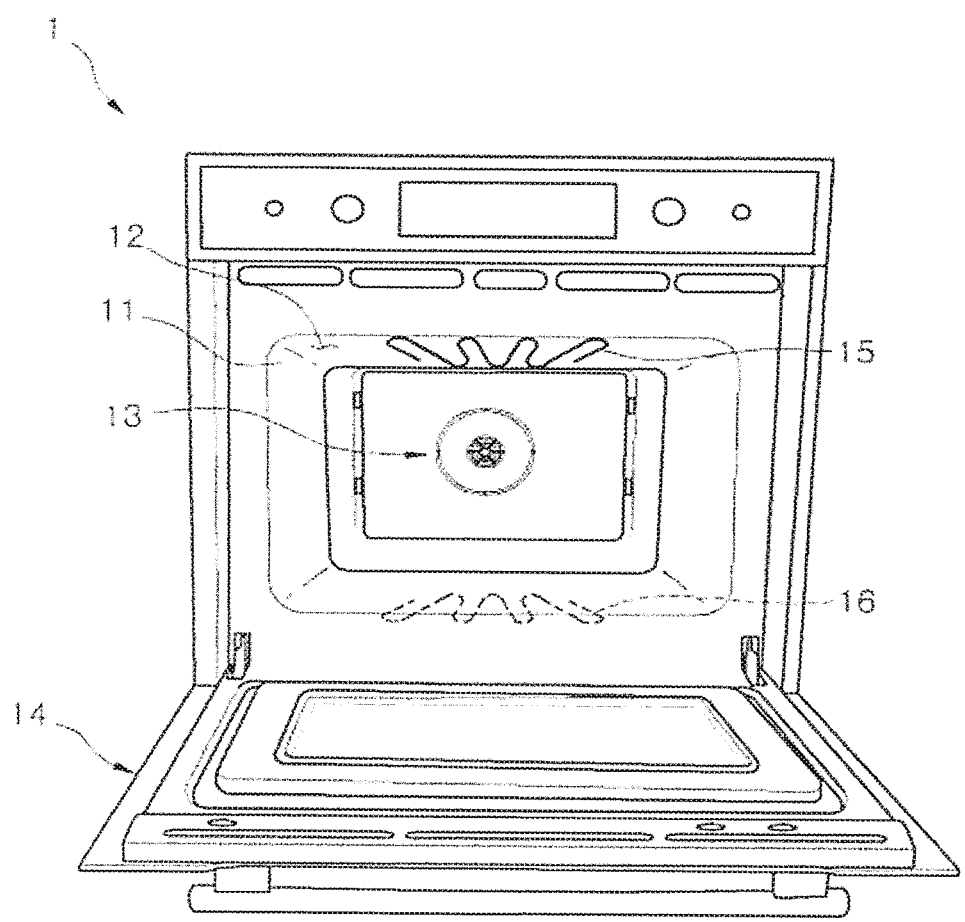
FIG. 1 is a front perspective view of a cooking appliance according to an embodiment.
Figure 2:
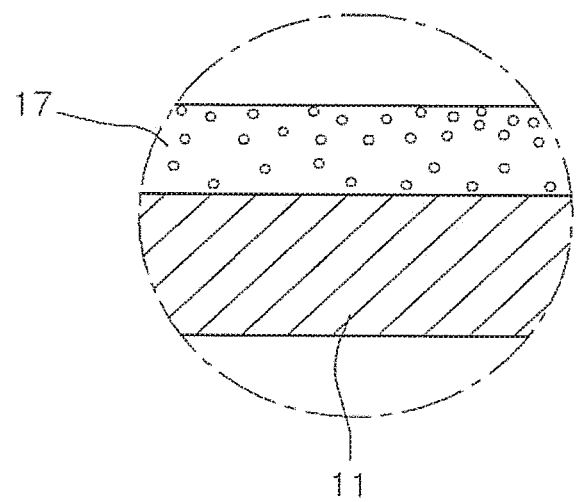
FIG. 2 is a partially enlarged cross-sectional view of an inner surface of a cavity of the cooking appliance of FIG. 1.

An enamel composition according to an embodiment may include silicon dioxide ($SiO_2$) at 25 to 50 wt %; boron oxide ($B_2O_3$) at 1 to 15 wt %; one or more of lithium superoxide ($Li_2O$), sodium oxide ($Na_2O$), and potassium oxide ($K_2O$) at 10 to 20 wt %; sodium fluoride (NaF) at 1 to 5 wt %; zinc oxide (ZnO) at 1 to 10 wt %; and one or more of titanium dioxide ($TiO_2$), molybdenum oxide ($MoO_3$), bismuth oxide ($Bi_2O_3$), or cerium dioxide ($CeO_2$) at 20 to 40 wt %.

$SiO_2$ is a component that forms a glass structure and strengthens a skeleton of the glass structure to enhance chemical resistance of the enamel composition and to facilitate expression of characteristics of a metal oxide acting as a catalyst. As a metal oxide catalyst has inferior heat resistance and inferior chemical resistance to those of other components, a large amount thereof may not be included in the enamel composition. However, as $SiO_2$ has a structure with a large pore size, when an appropriate amount of $SiO_2$ is included in the glass composition, solubility of the metal oxide catalyst in the glass may be increased. Accordingly, a content ratio of $SiO_2$ and the metal oxide catalyst may be appropriately controlled to exhibit high heat resistance and high chemical resistance and express characteristics of the metal oxide catalyst. $SiO_2$ may be included at 25 to 50 wt % in the enamel composition. When $SiO_2$ is included at greater than 50 wt %, it may interfere with the addition of other components, degrading cleanability. When $SiO_2$ is included at less than 25 wt %, the silicate-based glass composition according to embodiments may break down.

$B_2O_3$ serves as a glass former and is a component that acts to allow each component of the enamel composition to be uniformly melted. In addition, $B_2O_3$ serves to adjust a coefficient of thermal expansion and a fusion flow of the enamel composition to enhance coatability. Additionally, $B_2O_3$ serves to allow an appropriate viscosity to be maintained during firing of enamel and control the glass composition from crystallizing. $B_2O_3$ may be included at 1 to 15 wt % in the enamel composition. When $B_2O_3$ is included at greater than 15 wt %, it may interfere with the addition of other components, degrading cleanability. When $B_2O_3$ is included at less than 1 wt %, the glass composition may break down, or the glass composition may be crystallized.

$Li_2O$, $Na_2O$, and $K_2O$ serve to enhance cleanability of the enamel composition. One or more of the $Li_2O$, the $Na_2O$, or the $K_2O$ may be included at 10 to 20 wt % in the enamel composition. When the one or more of the $Li_2O$, the $Na_2O$, or the $K_2O$ is included at greater than 20 wt %, a coefficient of thermal expansion of the glass may be greatly increased, degrading coatability. When the one or more of the $Li_2O$, the $Na_2O$, or the $K_2O$ is included at less than 10 wt %, cleanability may be degraded.

NaF also serves to enhance cleanability of the enamel composition. NaF may be included at 1 to 5 wt % in the enamel composition. When NaF is included at greater than 5 wt %, it may interfere with the addition of other components, degrading durability. When NaF is included at less than 1 wt %, cleanability may be degraded.

In embodiments disclosed herein, the $SiO_2$ and the $B_2O_3$ serve as network forming oxides, the above-described alkali metal oxides serve as network modifying oxides, and the ZnO serves as an intermediate oxide to balance the two types of metal oxides. In embodiments disclosed herein, the ZnO may be included at 1 to 10 wt % in the enamel composition. When ZnO is included at greater than 10 wt %, vitrification may be difficult, and thermal properties may be degraded. On the other hand, when ZnO is included at less than 1 wt %, spreadability of the enamel composition during firing may be decreased to form a non-uniform coating, and accordingly, surface characteristics and coatability of the coating may be degraded.

$TiO_2$, $MoO_3$, $Bi_2O_3$, and $CeO_2$ are components that are capable of improving an oil or sugar contaminant cleaning ability and enhancing adhesion of the enamel composition applied onto a base metal. In embodiments disclosed herein, one or more of $TiO_2$, $MoO_3$, $Bi_2O_3$, or $CeO_2$ may be included at 20 to 40 wt % in the enamel composition. When the one or more of the $TiO_2$, the $MoO_3$, the $Bi_2O_3$, or the $CeO_2$ is included at greater than 40 wt %, the one or more of the $TiO_2$, the $MoO_3$, the $Bi_2O_3$, or the $CeO_2$ may interfere with the addition of other components, degrading durability. On the other hand, when the one or more of the $TiO_2$, the $MoO_3$, the $Bi_2O_3$, or the $CeO_2$ is included at less than 20 wt %, an oil or sugar contaminant cleaning ability may be weakened, and adhesion to a base metal may be degraded. In order to provide an optimal composition ratio of a silicate-based component for realizing not only excellent cleanability but also high heat resistance and high chemical durability, the enamel composition according to embodiments may be controlled so that a sum of a content of $SiO_2$ and a content of $TiO_2$ is 30 wt % or more, $TiO_2$ may be included at 5 to 20 wt %, and one or more of $MoO_3$, $Bi_2O_3$, or $CeO_2$ may be included at 5 to 15 wt %. In order to provide an enamel composition having excellent cleanability and high durability, the enamel composition may include all of the $MoO_3$, the $Bi_2O_3$, and the $CeO_2$.

The enamel composition according to embodiments may further include one or more of $MnO_2$, $Fe_2O_3$, $Co_3O_4$, or NiO at 2 to 5 wt % to enhance adhesion thereof to a base steel plate. When the one or more of the $MnO_2$, the $Fe_2O_3$, the $Co_3O_4$, or the NiO is included at less than 2 wt %, adhesion of an enamel coating to a base steel plate may be degraded. On the other hand, when the one or more of the $MnO_2$, the $Fe_2O_3$, the $Co_3O_4$, or the NiO is included at greater than 5 wt %, the one or more of the $MnO_2$, the $Fe_2O_3$, the $Co_3O_4$, or the NiO may interfere with the addition of other components, degrading cleanability.

As mentioned above, conventional enamel compositions consume a large amount of energy because the conventional enamel compositions enable cleaning only when heated (pyrolyzed) under a condition of a high temperature of 450 to 500° C. for about 4 hours. However, the enamel composition according to embodiments enables removal of sugar contaminants containing sugar even when heated (pyrolyzed) under a condition of a high temperature of 450 to 500° C. for less than an hour due to having the above-described novel composition ratio. Accordingly, use of the enamel composition according to embodiments provides an effect of energy saving and a reduction in cleaning time. In addition, the enamel composition according to embodiments enables prompt removal of oil contaminants at room temperature without carrying out a water soaking process, which is advantageous for easily managing the hygiene of a cooking appliance.

Method for Preparing Enamel Composition

A method (100) of preparing an enamel composition according to embodiments may include providing materials for an enamel composition, the materials including $SiO_2$ at 25 to 50 wt %; $B_2O_3$ at 1 to 15 wt %; one or more of $Li_2O$, $Na_2O$, or $K_2O$ at 10 to 20 wt %; NaF at 1 to 5 wt %; ZnO at 1 to 10 wt %; and one or more of $TiO_2$, $MoO_3$, $Bi_2O_3$, or $CeO_2$ at 20 to 40 wt %; melting the materials (120); and quenching the melted materials to form an enamel composition (130).

The materials may be sufficiently blended and then melted. The materials may be melted at 1,200 to 1,400° C. In addition, the materials may be melted for 1 to 2 hours. Afterward, the melted materials may be quenched by a quenching roller using a chiller, for example. As a result, the enamel composition may be formed.

Cooking Appliance

The enamel composition according to embodiments may be applied on one surface of a target object to be coated with the enamel composition. The target object may be a metal plate, a glass plate, or a portion or entirety of a cooking appliance. The enamel composition may be applied onto an inner surface of the cavity of the cooking appliance or an inner surface of the door of the cooking appliance.

Referring to FIG. 1, a cooking appliance 1 according to embodiments may include a cavity 11 that forms a cooking chamber, a door 14 that selectively opens and closes the cooking chamber, one or more heating sources 13, 15, and 16 that provide heat to the cooking chamber, and a coating layer that is formed of the enamel composition according to embodiments applied onto an inner surface of the cavity 11 or an inner surface of the door 14.

The cavity 11 may be formed in a hexahedral shape, a front surface of which is open. The heating sources 13, 15, and 16 may include a convection assembly 13 that discharges heated air into the cavity 11, an upper heater 15 disposed at a top of the cavity 11, and a lower heater 16 disposed at the bottom of a cavity 11. The upper heater 15 and the lower heater 16 may be provided inside or outside of the cavity 11. Of course, the heating sources 13, 15, and 16 do not necessarily include the convection assembly 13, the upper heater 15, and the lower heater 16. That is, the heating sources 13, 15, and 16 may include one or more of the convection assembly 13, the upper heater 15, or the lower heater 16.

Figure 3:
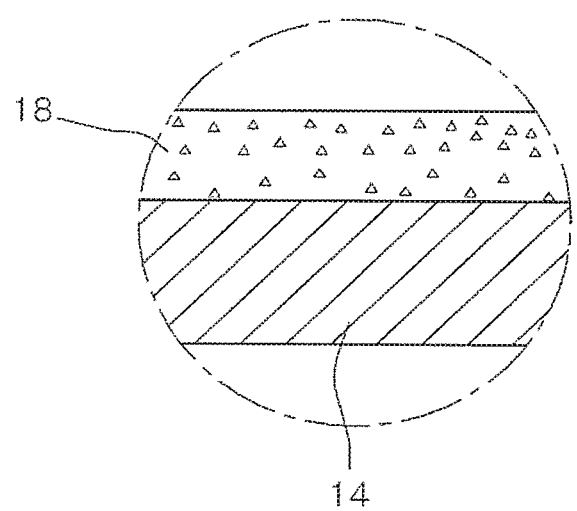
FIG. 3 is a partially enlarged cross-sectional view of an inner surface of a door of the cooking appliance of FIG. 1.

Referring to FIG. 3 and FIG. 4, the enamel composition according to embodiments may be applied onto an inner surface of the cavity 11 of the cooking appliance 1 or an inner surface of the door 14 thereof by a dry process or a wet process. The cavity 11 and the door 14 may be formed of a metal plate, and coating layers 17 and 18 formed of the enamel composition according to embodiments may be directly formed as a single layer on the metal plate.

According to the dry process, the enamel composition materials may be dispersed in an organic binder, and the enamel composition materials and organic binder, which have been blended, may be subjected to milling in a ball mill to prepare frit. On the other hand, according to the wet process, the enamel composition materials may be dispersed in water ($H_2O$) and a pigment, and the enamel composition materials, water ($H_2O$), and pigment, which have been blended, may be subjected to milling in a ball mill to prepare frit.

Afterward, the frit prepared by the dry process or the wet process may be applied onto an inner surface of the cavity 11 of the cooking appliance 1 or an inner surface of the door 14 thereof by a spraying method. The applied frit may be fired at 600 to 900° C. for 100 to 450 seconds and applied on an inner surface of the cavity 11 of the cooking appliance 1 or an inner surface of the door 14 thereof.

Hereinafter, embodiments will be described with respect to examples.

EXAMPLES

Preparation of Enamel Composition

Enamel compositions were prepared in the compositions shown in Table 1 below. Raw materials of components were sufficiently blended in a V-mixer for 3 hours. In this case, sodium carbonate ($Na_2CO_3$), potassium carbonate ($K_2CO_3$), and lithium carbonate ($Li_2CO_3$) were used respectively as raw materials of $Na_2O$, $K_2O$, and $Li_2O$, and the same compounds as shown in Table 1 were used as the remaining components. The blended material was sufficiently melted at 1,300° C. for one and a half hours and then quenched in a quenching roller to obtain cullet.

An initial particle size of the cullet thus obtained by the above process was controlled using a grinder (ball mill), and then, the resulting cullet was ground using a jet mill for about 5 hours and passed through a 325 mesh sieve (ASTM C285-88) to control the particle diameter thereof to be 45 μm or less, thereby preparing frit (a powder).

TABLE 1

| Components | Examples | | | | | | | Comparative Examples | | |
|---|---|---|---|---|---|---|---|---|---|---|
| (wt %) | 1 | 2 | 3 | 4 | 5 | 6 | 7 | 1 | 2 | 3 |
| $SiO_2$ | 28.63 | 39.49 | 49.73 | 36.49 | 33.11 | 48.2 | 35.12 | 16.62 | 52.11 | 27.24 |
| $B_2O_3$ | 10.89 | 6.62 | 1.5 | 13.06 | 8.27 | 3.1 | 13.06 | 26.49 | 2.45 | 4.52 |
| $Na_2O$ | 11.7 | 10.03 | 11.76 | 11.76 | 10.03 | 12.11 | 11.76 | 11.76 | 11.76 | 11.76 |
| $K_2O$ | 3.9 | 3.34 | 3.92 | 3.92 | 3.03 | 3.92 | 3.92 | 3.92 | 3.92 | 7.21 |
| $Li_2O$ | 1.31 | 1.12 | 1.32 | 1.32 | 1.12 | 1.32 | 1.32 | 1.32 | 1.32 | 6.55 |
| NaF | 3.27 | 2.8 | 3.28 | 3.29 | 2.8 | 3.28 | 3.29 | 3.28 | 3.28 | 6.24 |
| $TiO_2$ | 12.79 | 12.86 | 12.87 | 13.06 | 12.86 | 12.44 | 12.78 | 15.3 | 11.21 | 15.21 |
| $MnO_2$ | 0.2 | 0 | 0 | 0 | 0 | 0 | 0 | 0 | 0 | 0 |
| $Fe_2O_3$ | 0.2 | 0 | 0 | 0 | 0 | 0 | 0 | 0 | 0 | 0 |
| $Co_3O_4$ | 2 | 0 | 1.78 | 1.76 | 0 | 1.78 | 1.76 | 0 | 0 | 0 |
| NiO | 0.6 | 0 | 0.65 | 0.65 | 0 | 0.65 | 0.65 | 0 | 0 | 0 |
| ZnO | 9.91 | 9.05 | 1 | 1.2 | 11.25 | 1 | 1.2 | 6.62 | 4.21 | 6.62 |
| $MoO_3$ | 4.72 | 4.69 | 3.69 | 3.79 | 6.21 | 3.69 | 0 | 5.19 | 4.25 | 5.15 |
| $Bi_2O_3$ | 9.16 | 8.71 | 7.21 | 8.11 | 9.21 | 7.21 | 9.02 | 8.21 | 4.2 | 8.21 |
| $CeO_2$ | 0.72 | 1.29 | 1.29 | 1.591 | 2.11 | 1.29 | 6.12 | 1.29 | 1.29 | 1.29 |

Manufacture of Enamel Composition Specimen

Each of the frits prepared using the enamel compositions according to Examples 1 to 7 and Comparative Examples 1 to 3 was sprayed on a low carbon steel sheet having an area of 200 (mm)×200 (mm) and a thickness of 1 (mm) or less using a corona discharge gun. In this case, a voltage of the discharge gun was controlled under a condition within the range of 40 kV to 100 kV, and an amount of the frit sprayed on the low carbon steel sheet was 300 g/m2. The low carbon steel on which the frit had been sprayed was fired at 830° C. to 870° C. for 300 to 450 seconds to form a coating layer on one surface of the low carbon steel. In this case, the coating layer was formed to have a thickness of about 80 μm to 250 μm. As a result, specimens according to Examples 1 to 7 and Comparative Examples 1 to 3 were manufactured.

EXPERIMENTAL EXAMPLES

The specimens according to Examples and Comparative Examples were evaluated for abilities as described below, and results thereof are shown in Table 4.

1. Cleanability Against Chicken Oil Contaminant 1 g of chicken oil as a contaminant was uniformly and thinly spread on a surface of the specimen, in which a metal substrate (100 (mm)×100 (mm)) had been coated with the enamel composition, with a brush, and the specimen to which the contaminant had been applied was placed in a thermostat at 250 to 290° C. for an hour to solidify the contaminant. After solidification of the contaminant, the resulting specimen was cooled naturally, a degree of hardening of the contaminant was checked, and then the hardened chicken oil was subjected to back and forth (one round trip) wiping at a force of 3 kgf or less with a scouring pad for a frying pan which had been soaked with room-temperature water. A portion wiped on the contaminated specimen surface was uniformalized using a stick whose bottom has a diameter of 5 cm and is flat.

2. Cleanability Against Cherry Pie Contaminant 1 g of cherry pie as a contaminant was uniformly and thinly spread on the surface of the specimen, in which a metal substrate (100 (mm)×100 (mm)) had been coated with the enamel composition, with a brush, and the specimen to which the contaminant had been applied was placed in a thermostat at about 220° C. for 30 minutes to solidify the contaminant. After solidification of the contaminant, the resulting specimen was cooled naturally, and the contaminant was burned at 400° C. for an hour. Afterward, the hardened cherry pie contaminant was subjected to back and forth (one round trip) wiping at a force of 3 kgf or less with a scouring pad for a frying pan which had been soaked with room-temperature water. A portion wiped on the contaminated specimen surface was uniformalized using a stick whose bottom has a diameter of 5 cm and is flat.

In this case, a number of round trips of wiping the specimen was measured and defined as the number of round trips for cleaning, and evaluation standards for cleanability are shown in Table 2.

TABLE 2

| Number of round trips for cleaning | Level |
|---|---|
| 1~5 | LV. 5 |
| 6~15 | LV. 4 |
| 16~25 | LV. 3 |
| 26~50 | LV. 2 |
| 51~ | LV. 1 |

3. Evaluation of Durability

The specimens which had undergone the cleaning test according to the above item 2 were evaluated for durability, such as heat resistance and chemical resistance. The durability of each specimen was evaluated by determining a staining phenomenon. The staining phenomenon was determined by observing the surface of each specimen and quantifying a ratio of the area of the residue or stain to the entire surface area. Evaluation standards for the staining phenomenon are the same as shown in Table 3.

TABLE 3

| Stained area ratio | Level |
| --- | --- |
| 0% | LV. 5 |
| ~20% | LV. 4 |
| ~50% | LV. 3 |
| ~80% | LV. 2 |
| 80%~ | LV. 1 |

TABLE 4

| | Examples | | | | | | | Comparative Examples | | |
| --- | --- | --- | --- | --- | --- | --- | --- | --- | --- | --- |
| | 1 | 2 | 3 | 4 | 5 | 6 | 7 | 1 | 2 | 3 |
| Cleanability against chicken oil | LV.5 | LV.4 | LV.5 | LV.5 | LV.5 | LV.5 | LV.5 | LV.1 | LV.2 | LV.2 |
| Cleanability against cherry pie | LV.3 | LV.4 | L.V.5 | LV.5 | LV.5 | LV.5 | LV.5 | LV.2 | LV.1 | LV.1 |
| Stain level | LV.3 | LV.4 | LV.5 | LV.5 | LV.5 | LV.5 | LV.5 | LV.1 | LV.0 | LV.0 |

As shown in Table 4, it can be seen that Examples according to embodiments exhibited not only excellent cleanability but also excellent adhesion. On the other hand, it can be seen that Comparative Examples exhibited not only degraded cleanability due to not having an optimal composition ratio of a silicate-based component but also highly unsatisfactory adhesion due to an unstable glass composition, as compared with Examples according to embodiments.

The enamel composition according to embodiments may dramatically reduce a heating time in comparison to the conventional enamel composition. Accordingly, the enamel composition according to embodiments may save energy consumed in cleaning due to the shortened heating time.

In addition, the enamel composition according to embodiments enables cleaning at room temperature without carrying out a water soaking process especially for oil contaminants. Accordingly, a user may clean easily a cooking appliance. Additionally, the enamel composition according to embodiments may enhance hygiene of a cooking appliance.

Further, the enamel composition according to embodiments may exhibit enhanced adhesion to a base steel plate and also ensure excellent cleanability due to a special component ratio. Furthermore, as the enamel composition according to embodiments includes a silicate-based component in an optimal composition ratio, it may be excellent in not only cleanability but also heat resistance and chemical durability. In addition, as the enamel composition according to embodiments is able to be directly applied as a single layer onto a base steel plate without a buffer layer interposed therebetween, the single layer may be simply formed.

Embodiments disclosed herein provide a novel enamel composition which allows a heating time required for cleaning to be shortened. Embodiments disclosed herein provide a novel enamel composition which does not require a water soaking process to remove oil contaminants. Embodiments disclosed herein provide a novel enamel composition which is excellent in not only cleanability but also durability, such as heat resistance and chemical resistance.

In order to provide a enamel composition which enables cleaning while shortening the heating time that a conventional enamel composition requires and also cleaning at room temperature without carrying out a water soaking process for oil contaminants, an enamel composition according to embodiments may include $SiO_2$ at 25 to 50 wt %; $B_2O_3$ at 1 to 15 wt %; one or more of $Li_2O$, $Na_2O$, or $K_2O$ at 10 to 20 wt %; NaF at 1 to 5 wt %; ZnO at 1 to 10 wt %; and one or more of $TiO_2$, $MoO_3$, $Bi_2O_3$, or $CeO_2$ at 20 to 40 wt %. In addition, in order to provide a novel enamel composition which may exhibit enhanced adhesion to a base steel plate and also ensure excellent cleanability, an enamel composition according to embodiments may further include one or more of $MnO_2$, $Fe_2O_3$, $Co_3O_4$, or NiO at 2 to 5 wt %.

Additionally, in order to provide a novel enamel composition which exhibits high heat resistance and high chemical durability as well as excellent cleanability, an enamel composition according to embodiments may be controlled so that a sum of a content of the $SiO_2$ and a content of the $TiO_2$ is 30 wt % or more, $TiO_2$ may be included at 5 to 20 wt %, and one or more of $MoO_3$, $Bi_2O_3$, or $CeO_2$ may be included at 5 to 15 wt %.

Although embodiments have been described above with reference to the illustrated drawings, it is obvious that the embodiments are not limited to the embodiments and drawings disclosed herein, and various modifications may be made by those skilled in the art within the spirit and scope. In addition, even when the effect of the configuration is not explicitly described while the above-described embodiments are described, it is obvious that the effect predictable by the corresponding configuration should also be recognized.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distin-

What is claimed is:

1. An enamel composition, comprising:
silicon dioxide ($SiO_2$) at 25 to 50 wt %;
boron oxide ($B_2O_3$) at 1 to 15 wt %;
one or more of lithium superoxide ($Li_2O$), sodium oxide ($Na_2O$), or potassium oxide ($K_2O$) at 10 to 20 wt %;
sodium fluoride (NaF) at 1 to 5 wt %;
zinc oxide (ZnO) at 1 to 10 wt %;
one or more of titanium dioxide ($TiO_2$), molybdenum oxide ($MoO_3$), bismuth oxide ($Bi_2O_3$), or cerium dioxide ($CeO_2$) at 20 to 40 wt %; and each of
manganese dioxide ($MnO_2$), iron oxide ($Fe_2O_3$), cobalt oxide ($Co_3O_4$), and nickel oxide (NiO), wherein a sum of the manganese dioxide ($MnO_2$), iron oxide ($Fe_2O_3$), cobalt oxide ($Co_3O_4$), and nickel oxide (NiO) is 2 to 5 wt %.

2. The enamel composition of claim 1, wherein a sum of a content of the $SiO_2$ and a content of the $TiO_2$ is 30 wt % or more.

3. The enamel composition of claim 1, wherein the $TiO_2$ is included at 5 to 20 wt %.

4. The enamel composition of claim 1, wherein the one or more of the $MoO_3$, the $Bi_2O_3$, or the $CeO_2$ are included at 5 to 15 wt %.

5. A cooking appliance, comprising:
a cavity that forms a cooking chamber;
a door that selectively opens and closes the cooking chamber;
at least one heating source that provides heat to the cooking chamber; and
a coating layer formed of the enamel composition of claim 1 applied onto an inner surface of the cavity or an inner surface of the door.

* * * * *